(12) United States Patent
Nozawa et al.

(10) Patent No.: US 9,927,013 B2
(45) Date of Patent: Mar. 27, 2018

(54) TORQUE CONVERTER

(71) Applicant: YUTAKA GIKEN CO., LTD., Hamamatsu-Shi, Shizuoka (JP)

(72) Inventors: Yoichi Nozawa, Hamamatsu (JP); Yoshihisa Sugimura, Hamamatsu (JP); Hiroshi Okamoto, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 386 days.

(21) Appl. No.: 14/730,339

(22) Filed: Jun. 4, 2015

(65) Prior Publication Data

US 2015/0354683 A1     Dec. 10, 2015

(30) Foreign Application Priority Data

Jun. 10, 2014   (JP) ................................. 2014-119598

(51) Int. Cl.
  *F16H 41/04*     (2006.01)
  *F16H 41/24*     (2006.01)
  *F16H 45/02*     (2006.01)

(52) U.S. Cl.
  CPC ............. *F16H 41/04* (2013.01); *F16H 41/24* (2013.01); *F16H 45/02* (2013.01)

(58) Field of Classification Search
  CPC ........... F16H 41/04; F16H 41/24; F16H 45/02
  USPC .......................................................... 60/330
  See application file for complete search history.

(56) References Cited

U.S. PATENT DOCUMENTS

| | | | |
|---|---|---|---|
| 6,769,522 B2 * | 8/2004 | Kawamoto | ............. F16H 45/02 192/3.29 |
| 2003/0121743 A1 | 7/2003 | Kawamoto et al. | |
| 2004/0001756 A1 * | 1/2004 | Takabayashi | ........... F16H 41/28 416/180 |
| 2006/0137952 A1 | 6/2006 | Hinkel | |

FOREIGN PATENT DOCUMENTS

| | | |
|---|---|---|
| CN | 103206507 A | 7/2013 |
| JP | H09112650 A | 5/1997 |
| JP | 2003194184 A | 7/2003 |
| JP | 3494514 B2 | 2/2004 |
| JP | 2011-174588 A | 9/2011 |
| JP | 2011174588 A | 9/2011 |
| JP | 2011256950 A | 12/2011 |

OTHER PUBLICATIONS

Official Communication dated Apr. 1, 2017 issued over the corresponding Chinese Patent Application 201510309541.7.
Official Communication dated Nov. 2, 2016 corresponding to Japanese Application No. 2014-119598.

* cited by examiner

*Primary Examiner* — Thomas E Lazo
(74) *Attorney, Agent, or Firm* — Carrier Blackman & Associates, P.C.; Joseph P. Carrier; Jeffrey T. Gedeon

(57) ABSTRACT

In a torque convertor including a pump impeller, a turbine runner and a stator, an outer regulation surface facing inwards in a radial direction is provided at a turbine shell on an inward side in the radial direction from a turbine blade, an inner regulation surface that approaches and faces the outer regulation surface from inside in the radial direction is provided at a stator hub, and at least one of the outer regulation surface and the inner regulation surface is formed into a ring shape. Accordingly, movement of the stator along the radial direction at a time of transportation is inhibited (Continued)

and it is made unnecessary to form flange portions at core rings of the pump impeller and the turbine runner.

2 Claims, 1 Drawing Sheet

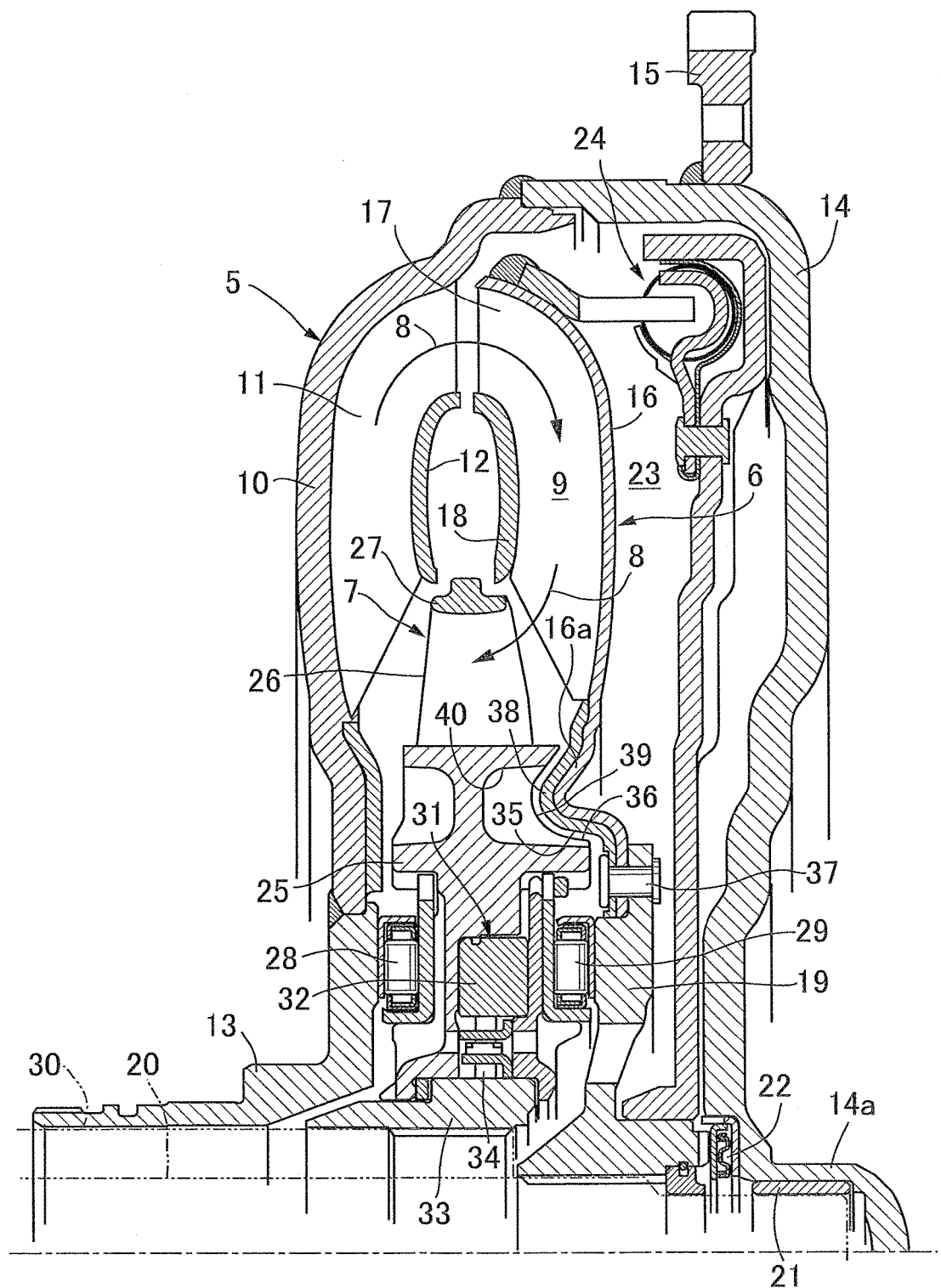

TORQUE CONVERTER

CROSS REFERENCE TO RELATED APPLICATIONS

The present application claims priority under 35 U.S.C. § 119 to Japanese Patent Application No. 2014-119598 filed Jun. 10, 2014 the entire contents of which are hereby incorporated by reference.

BACKGROUND OF THE INVENTION

Field of the Invention

The present invention relates to a torque converter comprising: a pump impeller in which a plurality of pump blades are provided on an inner surface of a pump shell having an inner peripheral portion fixedly provided at a pump hub; a turbine runner in which a plurality of turbine blades are provided on an inner surface of a turbine shell having an inner peripheral portion fixedly provided at a turbine hub that is disposed at a space in an axial direction from the pump hub; and a stator in which a plurality of stator blades are provided at an outer periphery of a stator hub and thrust bearings are respectively interposed between the pump hub and the stator hub and between the turbine hub and the stator hub.

Description of the Related Art

Such a torque converter is known in Japanese Patent Application Laid-open No. 2011-174588, Japanese Patent No. 3494514 and the like.

Incidentally, a torque converter becomes a part of a power transmission device when assembled by inserting a shaft to an inside of the torque converter, and in a transportation state before shaft insertion, the stator is likely to move in the radial direction. If such movement occurs, an excessively large load and impact are applied to the thrust bearings which are interposed respectively between the pump hub and the stator hub and between the turbine hub and the stator hub. Thereby, breakage of the thrust bearings occurs, or even if the breakage does not occur, reduction in function or reduction in the service life of the thrust bearings are likely to be caused from an initial stage due to an input exceeding a static rated load. In addition, if the stator remains to be shifted in the radial direction, an insertion work of the shaft is complicated at a time of assembly of the power transmission device.

In the torque converters disclosed in Japanese Patent Application Laid-open No. 2011-174588 and Japanese Patent No. 3494514 described above, flange portions which extended in the directions to approach each other are formed at an inner end portion in the radial direction of a pump core ring connecting the plurality of pump blades, and at an inner end portion in the radial direction of the turbine core ring connecting the plurality of turbine blades, and a stator core ring at an outer periphery of the stator is caused to face these flange portions from inside in the radial direction, whereby movement in the radial direction of the stator is avoided. However, there are growing needs for reduction in thickness of the torque converter, and formation of the flange portions sometimes becomes difficult.

SUMMARY OF THE INVENTION

The present invention is made in the light of the above circumstances, and has an object to provide a torque convertor that can inhibit movement of a stator along a radial direction at a time of transportation while making it unnecessary to form flange portions at core rings of a pump impeller and a turbine runner.

In order to achieve the object, according to a first feature of the present invention, there is provided a torque converter comprising: a pump impeller in which a plurality of pump blades are provided on an inner surface of a pump shell having an inner peripheral portion fixedly provided at a pump hub; a turbine runner in which a plurality of turbine blades are provided on an inner surface of a turbine shell having an inner peripheral portion fixedly provided at a turbine hub that is disposed at a space in an axial direction from the pump hub; and a stator in which a plurality of stator blades are provided at an outer periphery of a stator hub and thrust bearings are respectively interposed between the pump hub and the stator hub and between the turbine hub and the stator hub, wherein an outer regulation surface facing inwards in a radial direction is provided at the turbine shell on an inward side in the radial direction from the turbine blade, an inner regulation surface that approaches and faces the outer regulation surface from inside in the radial direction is provided at the stator hub, and at least one of the outer regulation surface and the inner regulation surface is formed into a ring shape.

According to the first feature, the inner regulation surface provided at the stator hub approaches and faces, from inside in the radial direction, the outer regulation surface provided on the turbine shell side. Therefore, when the stator is to move in the radial direction in a transportation state before shaft insertion, the inner regulation surface abuts on the outer regulation surface, whereby movement of the stator is inhibited. Therefore, an excessively large load and impact are not applied to the thrust bearings which are respectively interposed between the pump hub and the stator hub and between the turbine hub and the stator hub. Accordingly, the thrust bearings are not broken, and an input exceeding a static rated load does not act. Therefore, reduction of function of the thrust bearings is prevented, and reduction in the service life of the thrust bearings can be prevented. At the time of assembly of the power transmission device, insertion work of the shaft to the torque converter is facilitated. Forming flange portions at the core rings of the pump impeller and the turbine runner is made unnecessary, and the thickness of the torque converter can be reduced.

According to a second feature of the present invention, in addition to the first feature, a ring-shaped bending portion that bulges toward the stator side is provided at the turbine shell radially inwardly of the turbine blade, and a portion of the turbine shell that is disposed radially inwardly of the bending portion is fixed to the turbine hub with a plurality of pins spaced in a peripheral direction.

According to the second feature, the ring-shaped bending portion which bulges toward the stator side is provided at the turbine shell inside in the radial direction from the turbine blade, and the turbine shell is fixed to the turbine hub with a plurality of pins inside in the radial direction from the bending portion. Therefore, rigidity of the inner peripheral portion of the turbine shell is enhanced by formation of the bending portion, and a burden on the pins which fix the turbine shell to the turbine hub is reduced to enable reliable fixation, whereby reduction in thickness and weight of the turbine shell is enabled.

According to a third feature of the present invention, in addition to the second feature, a retainer is fixed to the turbine shell, the retainer being laid on the bending portion from the stator side while having a cross-sectional shape corresponding to the bending portion so as to form the outer regulation surface.

According to the third feature, the retainer which is laid on the bending portion from the stator side so as to form the outer regulation surface is fixed to the turbine shell. Therefore, rigidity of the inner peripheral portion of the turbine shell is further enhanced, the thickness of the turbine shell can be further reduced, and degree of freedom of design can be enhanced.

According to a fourth feature of the present invention, in addition to the third feature, the retainer is fixed by the pins to the turbine hub together with the turbine shell.

According to the fourth feature, the structure in which the retainer is fixed to the turbine hub together with the turbine shell with the pins is adopted, whereby an exclusive component for fixing the retainer is made unnecessary, and the number of components can be reduced.

The above and other objects, characteristics and advantages of the present invention will be clear from detailed descriptions of the preferred embodiment which will be provided below while referring to the attached drawings.

BRIEF DESCRIPTION OF THE DRAWING

FIG. 1 is an essential part longitudinal sectional view of a torque converter.

DESCRIPTION OF THE PREFERRED EMBODIMENT

Explaining an embodiment of the present invention with reference to accompanying FIG. 1 hereinafter, a torque converter includes a pump impeller 5, a turbine runner 6 that is disposed to face the pump impeller 5, and a stator 7 that is disposed between inner peripheral portions of the pump impeller 5 and the turbine runner 6, and among the pump impeller 5, the turbine runner 6 and the stator 7, a circulation circuit 9 that circulates a hydraulic oil is formed as shown by arrows 8.

The pump impeller 5 has a bowl-shaped pump shell 10, a plurality of pump blades 11 that are provided on an inner surface of the pump shell 10, a pump core ring 12 that connects the pump blades 11, and a pump hub 13 that is fixed to an inner peripheral portion of the pump shell 10 by welding, for example, and an oil pump (not illustrated) that supplies the hydraulic oil to the torque converter is operatively connected to the pump hub 13.

Further, a side cover 14 which covers the turbine runner 6 from outside is fixed to an outer peripheral portion of the pump shell 10 by welding, and a ring gear 15 is fixed to an outer peripheral portion of the side cover 14 by welding. A drive plate (not illustrated) connected to a crankshaft of an engine is fastened to the ring gear 15, and rotational power is inputted to the pump impeller 5 from the engine.

The turbine runner 6 has a bowl-shaped turbine shell 16, a plurality of turbine blades 17 that are provided on an inner surface of the turbine shell 16, a turbine core ring 18 that connects the turbine blades 17, and a turbine hub 19 that is fixed to an inner peripheral portion of the turbine shell 16 and is disposed at a position spaced in an axial direction from the pump hub 13.

An output shaft 20 that transmits the rotational power from the engine is spline-coupled to the turbine hub 19, and an end portion of the output shaft 20 is supported, via a bearing bush 21, by a support tube portion 14a in a bottomed cylinder shape which the side cover 14 integrally has in a center portion thereof. Further, a needle thrust bearing 22 is interposed between the turbine hub 19 and the side cover 14.

A clutch chamber 23 that communicates with the circulation circuit 9 is formed between the side cover 14 and the turbine shell 16, and in the clutch chamber 23, a lock up clutch 24 that can directly connect the turbine runner 6 and the side cover 14 is accommodated.

The stator 7 has a stator hub 25 that is disposed between the pump hub 13 and the turbine hub 19, a plurality of stator blades 26 that are provided on an outer periphery of the stator hub 25, and a stator core ring 27 that connects outer peripheries of the stator blades 26. A thrust bearing 28 is interposed between the pump hub 13 and the stator hub 25, and a thrust bearing 29 is interposed between the turbine hub 19 and the stator hub 25.

A one-way clutch 31 is interposed between the stator hub 25 and a stator shaft 30 that relatively rotatably surrounds the output shaft 20 which rotates with the turbine hub 19, and the one-way clutch 31 is formed by being provided with a clutch member 34 between an outer race 32 that is press-fitted in the stator hub 25, and an inner race 33 which is spline-coupled to the stator shaft 30. The stator shaft 30 is supported by a transmission case (not illustrated) so as to be incapable of rotating.

An outer regulation surface 35 that faces inwards in a radial direction is provided at the turbine shell 16 on an inward side in the radial direction from the turbine blade 17, an inner regulation surface 36 that approaches and faces the outer regulation surface 35 from inside in the radial direction is provided at the stator hub 25, and at least one of the outer regulation surface 35 and the inner regulation surface 36, the outer regulation surface 35 in this embodiment, is formed into a ring shape.

At the turbine shell 16, a ring-shaped bending portion 16a which bulges toward the stator 7 side is provided radially inwardly of the turbine blade 17. A portion of the turbine shell 16 that is disposed radially inwardly of the bending portion 16a is fixed to the turbine hub 19 with a plurality of pins 37 which are spaced in a peripheral direction.

In addition, a retainer 38 that is laid on the bending portion 16a from the stator 7 side while having a cross-sectional shape corresponding to the bending portion 16a is fixed to the turbine shell 16, and the retainer 38 is fixed to the turbine hub 19 together with the turbine shell 16 with the pins 37.

The outer regulation surface 35 is formed by the retainer 38. A recessed portion 39 receiving the bending portion 16a and a portion of the retainer 38, which is laid on the bending portion 16a, is provided on a side surface on the turbine runner 6 side, of the stator hub 25, and a side surface on an inward side in the radial direction of the recessed portion 39 forms the inner regulation surface 36. Further, at a side surface on the turbine runner 6 side, of the stator hub 25 in a portion where the recessed portion 39 is formed, a plurality of weight-reduction recessed portions 40 that are disposed at spaces in the peripheral direction are formed more deeply than the recessed portion 39, and the inner regulation surfaces 36 are formed at a plurality of spots which are spaced in the peripheral direction of the stator hub 25 in such a manner that the plurality of weight-reduction recessed portions 40 are respectively interposed among the inner regulation surfaces 36.

Next, explaining an operation of the embodiment, the outer regulation surface 35 which faces inwards in the radial direction is provided at the turbine shell 16, on the inward side in the radial direction from the turbine blade 17, the inner regulation surface 36 which approaches and faces the outer regulation surface 35 from inside in the radial direction is provided at the stator 25, and at least one of the outer regulation surface 35 and the inner regulation surface 36 is formed into a ring shape. Therefore, when the stator 7 is to move in the radial direction in a transportation state before insertion of the output shaft 20 and the stator shaft 30, the inner regulation surface 36 abuts on the outer regulation surface 35, whereby movement of the stator 7 is inhibited. Therefore, an excessively large load and impact are not applied to the thrust bearings 28, 29 which are respectively interposed between the pump hub 13 and the stator hub 25 and between the turbine hub 19 and the stator hub 25. Accordingly, the thrust bearings 28, 29 are not broken, and an input exceeding a static rated load does not act. Therefore, reduction in function of the thrust bearings 28, 29 can be prevented, and reduction in the service life thereof can be prevented. Insertion work of the output shaft 20 and the stator shaft 30 to the torque converter is facilitated at a time of assembly of the power transmission device, and it is made unnecessary to form flange portions at the core rings 12, 18 of the pump impeller 5 and the turbine runner 6, whereby thickness of the torque converter can be reduced.

Further, the ring-shaped bending portion 16a which bulges toward the stator 7 side is provided at the turbine shell 16 radially inwardly of the turbine blade 17, and a portion of the turbine shell 16 which is disposed radially inwardly of the bending portion 16a is fixed to the turbine hub 19 with the plurality of pins 37 spaced in the peripheral direction. Therefore, rigidity of the inner peripheral portion of the turbine shell 16 is enhanced by formation of the bending portion 16a, a burden on the pins 37 which fix the turbine shell 16 to the turbine hub 19 is reduced to enable reliable fixation, and reduction in thickness and weight of the turbine shell 16 are enabled.

Further, the retainer 38 which forms the outer regulation surface 35 by being laid on the bending portion 16a from the stator 7 side while having the cross-sectional shape corresponding to the bending portion 16a is fixed to the turbine shell 16. Therefore, the rigidity of the inner peripheral portion of the turbine shell 16 is further enhanced, the thickness of the turbine shell 16 can be further reduced, and the degree of freedom of design can be enhanced.

In addition, the retainer 38 is fixed to the turbine hub 19 together with the turbine shell 16 with the pins 37. Therefore, an exclusive component for fixing the retainer 38 is made unnecessary, and the number of components can be reduced.

The embodiment of the present invention is described thus far, but the present invention is not limited to the above described embodiment, and various design changes can be made without departing from the gist of the present invention.

For example, in the aforementioned embodiment, the outer regulation surface 35 is formed on the retainer 38 which is laid on the bending portion 16a provided at the inner peripheral portion of the turbine shell 16 by bulging toward the stator 7 side, and the inner regulation surface 36 is formed by the side surface of the recessed portion 39 which is provided at the stator hub 25 to receive the bending portion 16a and the portion of the retainer 38, which is laid on the bending portion 16a. However, the outer regulation surface in a step shape may be formed on the inner peripheral side of the turbine shell 16, and the inner regulation surface in a step shape which approaches and faces the outer regulation surface from inside in the radial direction may be formed at the stator hub 25.

What is claimed is:

1. A torque converter comprising:
   a pump impeller in which a plurality of pump blades are provided on an inner surface of a pump shell having an inner peripheral portion fixedly provided at a pump hub;
   a turbine runner in which a plurality of turbine blades are provided on an inner surface of a turbine shell having an inner peripheral portion fixedly provided at a turbine hub that is disposed at a space in an axial direction from the pump hub; and
   a stator in which a plurality of stator blades are provided at an outer periphery of a stator hub and thrust bearings are respectively interposed between the pump hub and the stator hub and between the turbine hub and the stator hub,
   wherein an outer regulation surface facing inwards in a radial direction is provided at the turbine shell on an inward side in the radial direction from the turbine blade,
   an inner regulation surface that approaches and faces the outer regulation surface from inside in the radial direction is provided at the stator hub, and
   at least one of the outer regulation surface and the inner regulation surface is formed into a ring shape,
   wherein a ring-shaped bending portion that bulges toward the stator side is provided at the turbine shell radially inwardly of the turbine blade, and a portion of the turbine shell that is disposed radially inwardly of the bending portion is fixed to the turbine hub with a plurality of pins spaced in a peripheral direction, and
   wherein a retainer is fixed to the turbine shell, the retainer being laid on the bending portion from the stator side while having a cross-sectional shape corresponding to the bending portion so as to form the outer regulation surface.

2. The torque converter according to claim 1, wherein the retainer is fixed by the pins to the turbine hub together with the turbine shell.

* * * * *